(12) United States Patent
Patwardhan et al.

(10) Patent No.: US 7,667,920 B2
(45) Date of Patent: Feb. 23, 2010

(54) CORRECTING A TRACK PITCH ERROR WITH A SUBSEQUENT SERVO-WRITE PASS

(75) Inventors: Satyajit N. Patwardhan, Fremont, CA (US); Steven C. Smith, Santa Clara, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/005,959

(22) Filed: Dec. 28, 2007

(65) Prior Publication Data
US 2009/0168222 A1    Jul. 2, 2009

(51) Int. Cl.
G11B 21/02   (2006.01)
G11B 5/596   (2006.01)

(52) U.S. Cl. .............. 360/75; 360/77.08; 360/78.04

(58) Field of Classification Search .............. None
See application file for complete search history.

(56) References Cited

U.S. PATENT DOCUMENTS

| | | | |
|---|---|---|---|
| 4,918,972 A * | 4/1990 | Kenny et al. | 73/1.79 |
| 6,130,796 A | 10/2000 | Wiselogel | |
| 6,344,942 B1 * | 2/2002 | Yarmchuk | 360/75 |
| 6,469,859 B1 | 10/2002 | Chainer et al. | |
| 6,624,963 B2 | 9/2003 | Szita | |
| 6,751,042 B2 | 6/2004 | Bi et al. | |
| 6,765,744 B2 | 7/2004 | Gomez et al. | |
| 6,785,084 B2 | 8/2004 | Szita | |
| 6,950,256 B2 | 9/2005 | Kadokawa | |
| 7,088,533 B1 | 8/2006 | Shepherd et al. | |
| 7,164,552 B2 * | 1/2007 | Yamamoto | 360/78.05 |

FOREIGN PATENT DOCUMENTS

| | | |
|---|---|---|
| EP | 1592007 | 11/2005 |
| JP | 01296473 | 11/1989 |
| JP | 03203071 | 9/1991 |

OTHER PUBLICATIONS

Melkote, et al., "A Study of Radial Error Propagation and Self-Servowriting in Disk Drives", *Proceedings of the American Control Conference*, (May 2002),1372-1377.
Ye, et al., "Radial Error Propagation Issues in Self-Servo Track Writing Technology", *IEEE Transactions on Magnetics*, vol. 38, No. 5, (Sep. 2002),2180-2183.

* cited by examiner

Primary Examiner—Andrew L Sniezek (57) ABSTRACT

A method for correcting a track pitch error in servo tracks written on a magnetic recording media coupled with a disk surface, by using a subsequent servo-write pass, comprises propagating servo tracks across the magnetic recording media in a previous servo-write pass. The servo tracks have radial positioning servo code. The servo tracks enable a magnetic transducer to be positioned to at least one radial position on the magnetic recording media. At least one corrected radial reference point is calculated for the track pitch error written on the magnetic recording media, by identifying at least one inconsistency between a mechanical response of an actuator and the track pitch. A corrected location for at least one servo track is identified. At least one new servo track at the corrected location is propagated with the subsequent servo-write pass. Optimum data track distribution across the disk surface and optimum reading and writing of data to and from the magnetic recording media is enabled.

17 Claims, 5 Drawing Sheets

CORRECTING A TRACK PITCH ERROR WITH A SUBSEQUENT SERVO-WRITE PASS

TECHNICAL FIELD

This invention relates generally to the field of direct access storage devices and in particular to correcting a track pitch error, which is written with a previous servo-write pass, with a subsequent servo-write pass.

BACKGROUND

Direct access storage devices (DASD) have become part of everyday life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

The amount of data that can be stored on a disk is governed by many well-known physical principles. One factor in determining the amount of data that can be stored in an HDD is the ability of the magnetic transducer to write closely spaced data tracks onto the disk surface. The spacing of tracks on a disk surface is known as track pitch, and the unit of measure for expressing the density of tracks on a disk is tracks per inch or TPI. A smaller track pitch results in a higher TPI. The servo system of the HDD enables in part the magnetic transducer to be precisely positioned at a radius on the disk to write a data track. The precision, repeatability, and stability of the servo system enable adjacent data tracks to be written with a high TPI.

Coded information is written at every radius on a disk where a data track will be written. This coded information is used to identify the location of data to be written on the magnetic recording media of the disk. Once the data is written, the coded information is used to locate the written data so that it can be read. This coded information is known as servo data. Servo data identifies the location of the track with respect to its order of radius from the disk's center of rotation and its sector in a circumferential distance from an index around the disk. The process of writing servo data is known in the art as servo-write.

The majority of the servo-write processes used today comprise a magnetic transducer writing a servo track at each sector of each radius of a potential data track. The servo-write process is typically a time consuming process and depending upon the design of the HDD can require several hours per HDD to accomplish. Today's demands for higher TPI increase the time required for servo-write. Servo-write is typically a very precise and exacting process in which tens of thousands of tracks per inch are written onto a disk surface.

SUMMARY OF THE INVENTION

Various embodiments of the present invention are described herein. A method for correcting a track pitch error in servo tracks written on a magnetic recording media coupled with a disk surface, by using a subsequent servo-write pass, comprises propagating servo tracks across the magnetic recording media in a previous servo-write pass. The servo tracks have radial positioning servo code. The servo tracks enable a magnetic transducer to be positioned to at least one radial position on the magnetic recording media. At least one corrected radial reference point is calculated for the track pitch error written on the magnetic recording media, by identifying at least one inconsistency between a mechanical response of an actuator and the track pitch. A corrected location for at least one servo track is identified. At least one new servo track at the corrected location is propagated with the subsequent servo-write pass. Optimum data track distribution across the disk surface and optimum reading and writing of data to and from the magnetic recording media is enabled.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with a brief overview of a hard disk drive (HDD) which comprises a head gimbal assembly (HGA) having a magnetic transducer operable to writing and reading servo data and correcting track pitch errors in accordance with embodiments of the present invention. The discussion will then focus on embodiments of the present invention in which a track pitch error in servo tracks written in a previous servo-write pass is corrected with a subsequent servo-write pass. The implementation of embodiments of the present invention will then be discussed.

Overview

Figure 1:
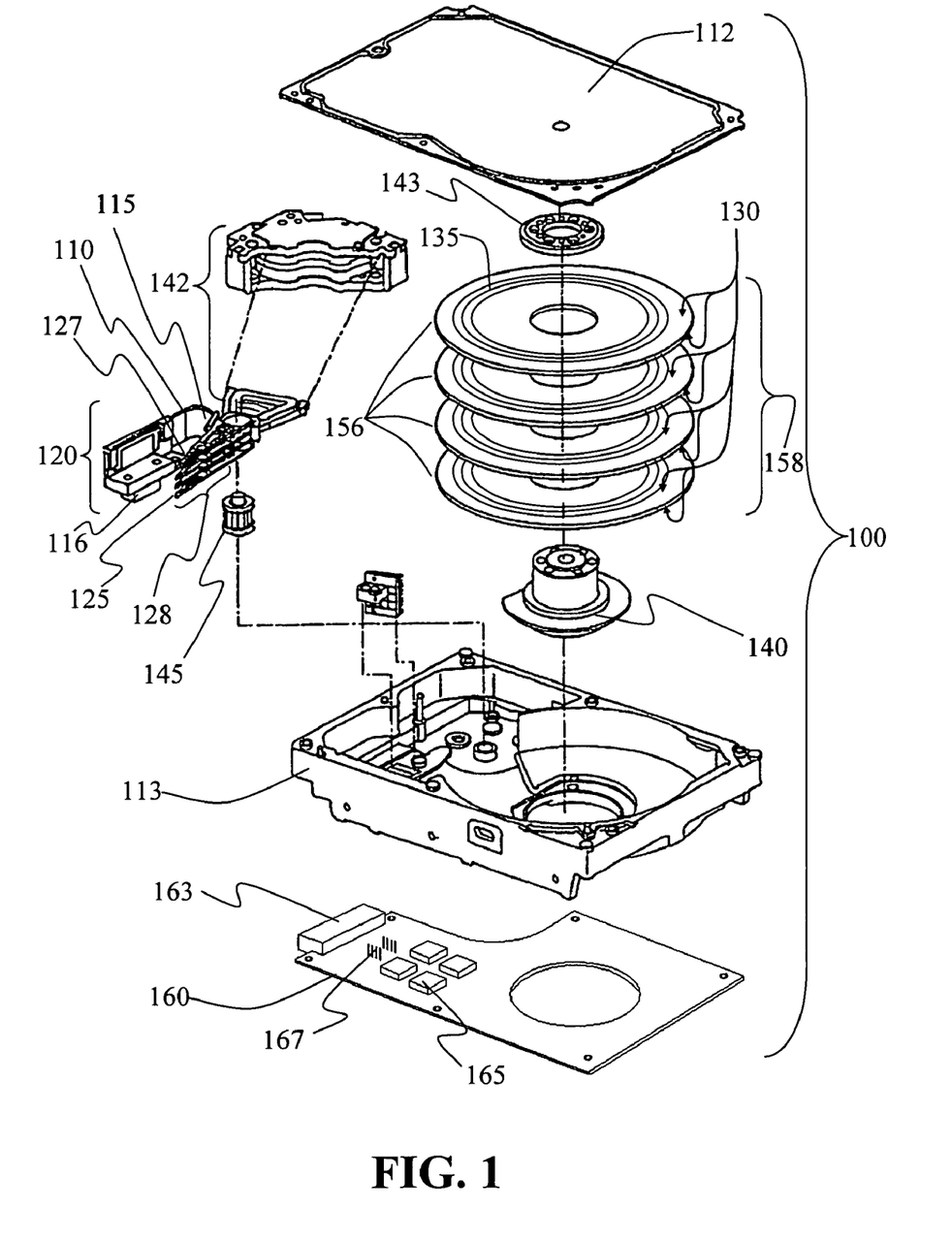
FIG. 1 is an isometric blow-apart of an HDD in accordance with one embodiment of the present invention.

With reference to FIG. 1, an isometric blow-apart of HDD 100 is presented in accordance with an embodiment of this invention. Base casting 113 provides coupling points for components and sub-assemblies such as disk stack 158, voice coil motor (VCM) 142, and head stack assembly (HSA) 120. Disk stack 158 is coupled with base casting 113 by means of motor-hub assembly 140 and disk clamp 143. Motor-hub assembly 140 will have at least one disk 156 coupled with it such that disk 156 can rotate about an axis common to motor-hub assembly 140 and the center of disk 156. Disk 156 has at least one disk surface 130 upon which reside data tracks 135. HSA 120, sometimes referred to as an actuator assembly or carriage, comprises at least one head gimbal assembly (HGA) 128, flex cable 110, HSA connector 116, suspension 127, and arm electronics (A/E) module 115. HGA 128 comprises suspension 127, which suspends hard disk drive slider 125 next to disk surface 130. Hard disk drive slider 125 is coupled with suspension 127. Flex cable 110, which is part of HSA 120, conveys data between HSA connector 116 and A/E module 115. A/E module 115 comprises a write channel and a read channel which energize a magnetic transducer coupled to slider 125 for writing and reading data from disk surface 130. HSA connector 116 also conveys control data between printed circuit board (PCB) 160 and VCM 142.

HSA 120 is coupled pivotally with base casting 113 by means of pivot bearing 145, such that VCM 142 can move HGA 128 with slider 125 arcuately across disk surface 130, thereby accessing data tracks 135. Upon assembly of HSA 120, disk stack 158, VCM 142, and other components with base casting 113, cover 112 is coupled with base casting 113 to enclose these components and sub-assemblies into HDD 100.

Once cover 112 is coupled with base casting 113, PCB 160 is coupled to base casting 113. PCB 160 comprises at least one electrical component 165 which in general performs the electrical tasks of HDD 100, such as servo control of VCM 142, status check of HDD 100 before writing data, and power control for sub-assemblies within HDD 100. HGA 128 is electrically coupled with PCB 160 via HSA connector 116 and an appropriately mating connection 167 on PCB 160. Electrical coupling of HDD 100 to a host system in which HDD 100 operates is enabled in part through PCB connector 163, coupled to PCB 160.

Figure 2:
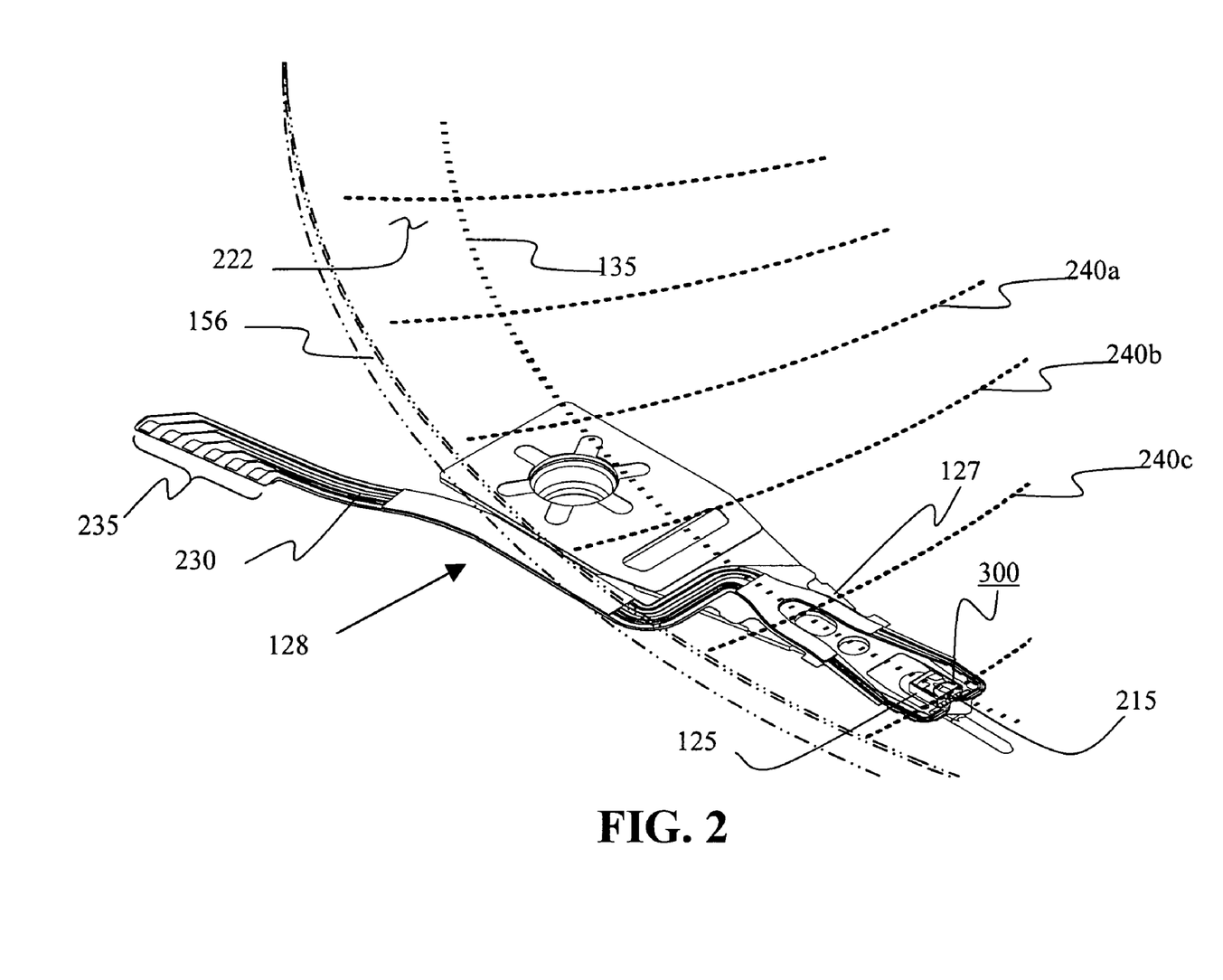
FIG. 2 is an isometric of a head gimbal assembly (HGA), a disk, and servo sectors in accordance with one embodiment of the present invention.

With reference to FIG. 2, an isometric of HGA 128 and disk 156 is presented in accordance with one embodiment of the present invention. Disk 156 is presented with phantom lines so that magnetic recording media 222, servo sector (240a, 240b, 240c), magnetic recording data track 135, and features of HGA 128 that face disk 156 are visible. Servo sector (240a, 240b, 240c) and magnetic recording data track 135 are written onto magnetic recording media 222. Commands from A/E module 115 for writing data track 135 are transmitted to magnetic transducer 215 via conductors 230. Conductors 230 also transmit data read by magnetic transducer 215 from servo sector (240a, 240b, 240c) and magnetic recording data track 135 via conductors 230 to A/E module 115.

Data tracks 135 comprise data recorded by a customer or user of HDD 100. Prior to recording data track 135 on magnetic recording media 222, servo sector (240a, 240b, 240c) is written onto magnetic recording media 222. Servo sector (240a, 240b, 240c) is used to locate customer data written on magnetic recording media 222. There exist several processes for writing servo sector (240a, 240b, 240c) that are well known by one of ordinary skill in the art. In general, a process for writing servo sector (240a, 240b, 240c) onto recording media 222 is known as servo-write. Examples of servo-write processes well known in the art are pack writing, clock head writing, non-clock head writing, media writing, gang/bank writing, printed media, and self-servo-write.

Embodiments of the present invention are beneficial to servo-write processes in which a small initial segment of servo sector (240a, 240b, 240c) is written and then propagated across magnetic recording media 222. Servo-write processes that are conducive to propagating small initial segment of servo sector (240a, 240b, 240c) across magnetic recording media 222 are known as self-servo-write processes. Types of self-servo-write processes are pack write, gang/bank writing, and media writing. Since self-servo-write is well known by one of ordinary skill by one of ordinary skill in the art, the following description is not intended to be an all inclusive detailed description of self-servo-write, and is presented for the sake of brevity and clarity.

Self-servo-write can be performed within a servo-writer such as a pack writer or an HDD such as HDD 100. One magnetic transducer 215 in HSA 120 receives a timing signal, which is transmitted through soldering pads 235 and conductors 230, and writes a small initial segment of servo sector (240a, 240b, 240c). Using a process known as bootstrapping, magnetic transducer 215 reads the small initial segment of servo sector (240a, 240b, 240c). Using an actuation device such as VCM 142, magnetic transducer 215 is positioned with respect to the just written small initial segment of servo sector (240a, 240b, 240c). Magnetic transducer 215 then writes a copy of the small initial segment of servo sector (240a, 240b, 240c) at an end of the small initial segment of servo sector (240a, 240b, 240c). In this reading and writing manner, the small initial segment of servo sector (240a, 240b, 240c) is propagated in one continuous servo sector (240a, 240b, 240c) extending from OD to ID of disk 156. The propagation of small initial segments of servo sector (240a, 240b, 240c) is repeated for every servo sector (240a, 240b, 240c) required on disk surface 130. After the first disk surface 130 is servo-written, the remaining disk surface(s) 130 in disk stack 158 are servo-written using the first disk surface 130 as a pattern.

The servowriting of subsequent disk surface(s) 130 is accomplished by reading a previously servo-written disk surface 130 and writing copies of servo sector (240a, 240b, 240c) onto another disk surface 130 in disk stack 158. The writing of copies of servo sector (240a, 240b, 240c) is accomplished with the magnetic transducer(s) 215 associated with the other disk surface(s) 130 on which copies of servo sector (240a, 240b, 240c) are to be written.

In the self-servo-write process a previous pass of writing and propagating servo sector (240a, 240b, 240c) is made across at least one disk surface 130 of disk stack 158. Servo sector (240a, 240b, 240c), which is written in the previous servo-write pass, comprises radial position data whereby magnetic transducer 215 is enabled to be positioned to at least one radial position on magnetic recording media 222. A subsequent servo-write pass contains servo code that is particular to the design of an HDD such as HDD 100. The subsequent servo-write pass writes its servo code in accordance to the radial position encoded by the previous servo-write pass.

Figure 3:
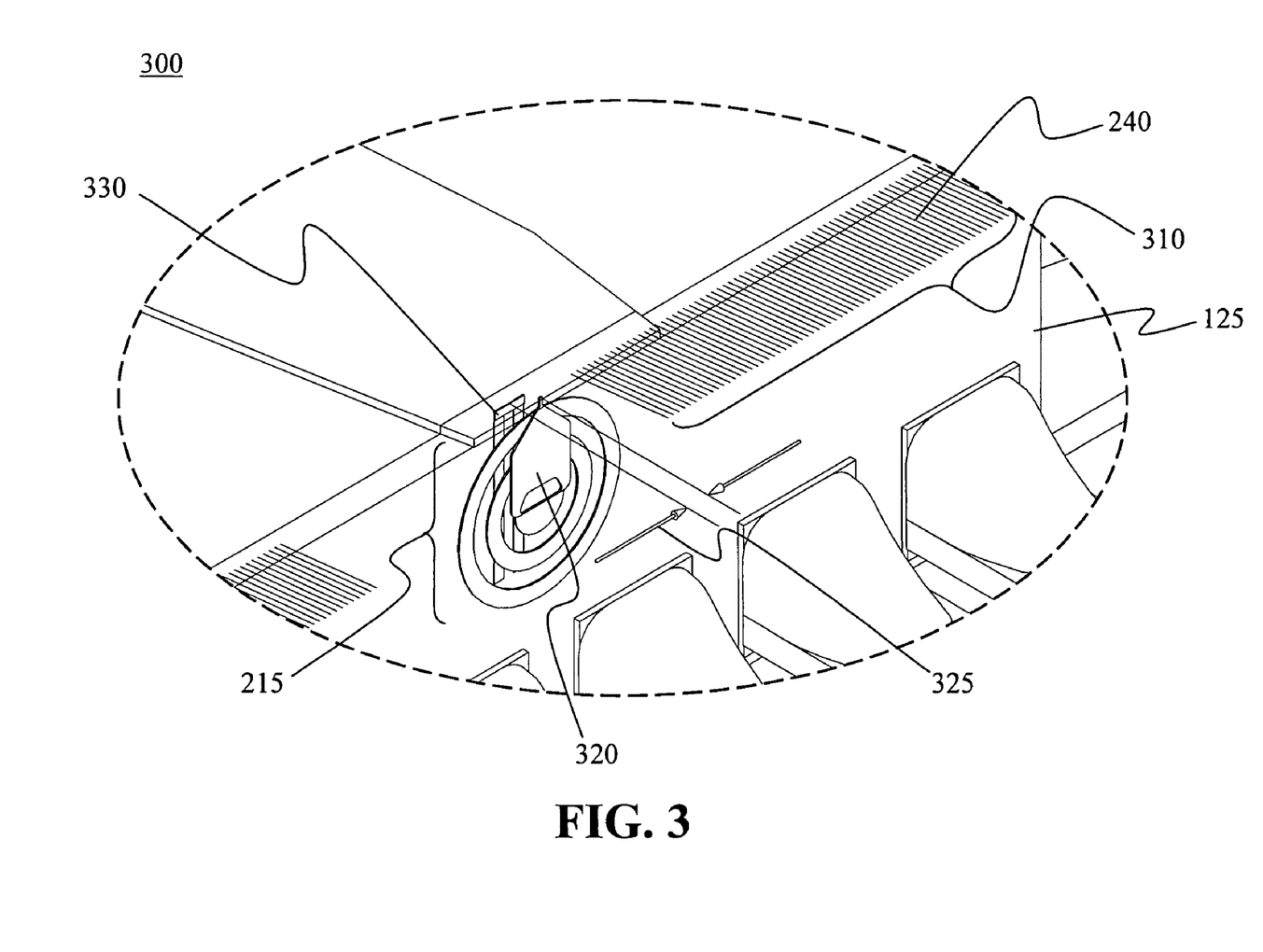
FIG. 3 is an isometric detail of an HGA, a disk, and servo tracks in accordance with one embodiment of the present invention.

With reference to FIG. 3, an isometric detail 300 of HGA 128, disk 156, and servo tracks 310 is presented in accordance with one embodiment of the present invention. A goal of a servo-write process is to evenly distribute a predetermined quantity of servo tracks 310 in servo sectors (240a, 240b, 240c) across magnetic recording media 222. Depending upon how well this goal is met, problems can arise due to unevenly distributed servo tracks 310 servo-written across magnetic recording media 222.

If a servo-write process writes servo tracks 310 too far apart, room on disk surface 130 may be insufficient to fit the required quantity of servo tracks 310. If a servo-write process writes a proper quantity of servo tracks 310 on disk surface 130 with some servo tracks 310 too far apart, other servo tracks 310 will be too close together. If a servo-write process writes servo tracks 310 too close together, there may be interference between adjacent servo tracks 310. Track interference can result in one servo track partially erasing an adjacent servo track, which can diminish the amplitude and the ability of the partially erased servo track to be detected.

Track pitch errors can be caused by several factors. Some examples of these factors are as follows: The coercivity of magnetic recording media 222 can vary across disk surface 130. Fly height 430 can vary as slider 125 flies at different locations on disk surface 130, thereby changing the read-back amplitude of servo tracks 130 at different locations. The temperature within servo-writer 410 can change fly height 430 as well as the magnetic performance of magnetic transducer 215. It is well understood in the art of servo control for hard disk drives that the center of a servo track 310 is determined by an algorithm known as APC ("A" plus "C"). Briefly, APC reads the relative amplitudes of adjacent servo data bursts and directs VCM 142 to move magnetic transducer 215 to a radius where a desired amplitude from the servo data bursts is read. With possibly changing magnetic performance of magnetic transducer 215 and/or magnetic recording media 222, the precise location of magnetic transducer 215 cannot always be determined by reading servo data bursts contained in servo tracks 310, hence leading to possible inaccuracies in the APC algorithm.

Physical Description

Figure 4:
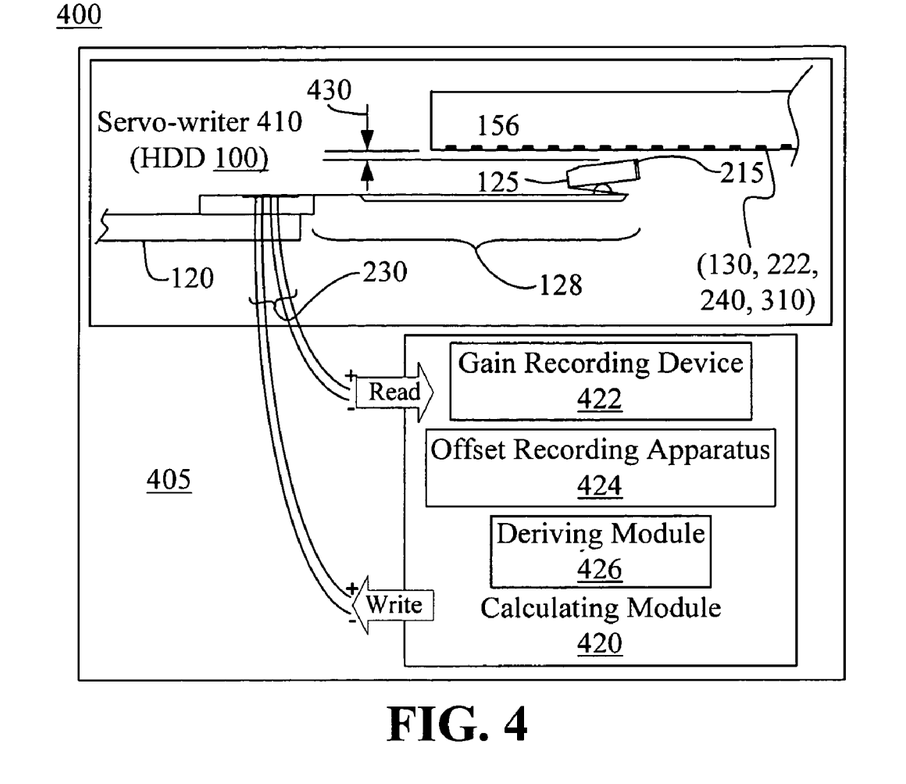
FIG. 4 is a block diagram of a system for correcting a track pitch error in servo tracks written on a magnetic recording media coupled with a disk surface in accordance with one embodiment of the present invention.

With reference to FIG. 4, block diagram 400 of system 405 is presented in accordance with one embodiment of the present invention. System 405 is a system for correcting a track pitch error in servo tracks 310 written in servo sector (240a, 240b, 240c) on a magnetic recording media 222 of a disk surface 130, by using a subsequent servo-write pass. System 405 will be described with reference to elements shown in FIG. 1, FIG. 2, and FIG. 3.

In accordance with an embodiment of the present invention, system 405 comprises servo-writer 410. Servo-writer 410 propagates servo tracks 310, having a radial positioning code, in servo sector (240a, 240b, 240c). Servo-writer 410 propagates servo tracks 310 in the previous servo-write pass across magnetic recording media 222. Servo tracks 310 enable magnetic transducer 215 to be positioned by HSA 120 to at least one radial position on magnetic recording media 222.

In accordance with an embodiment of the present invention, servo-writer 410 comprises HDD 100. HDD 100 comprises HGA 128. HGA 128 comprises magnetic transducer 215 which is configured for reading information from magnetic recording media 222, such as that contained in servo sector (240a, 240b, 240c), and for writing information to magnetic recording media 222, such as that comprising servo sector (240a, 240b, 240c). With reference to FIG. 1, HDD 100 comprises disk stack 158 and HSA 120, which are assembled in their designed association with each other. HDD 100 can benefit from embodiments of the present invention at the HDD level of assembly.

In accordance with an embodiment of the present invention, servo-writer 410 comprises a pack writer. A pack writer comprises an HGA such as HGA 128. HGA 128 comprises magnetic transducer 215 which is configured for reading information from magnetic recording media 222, such as that contained in servo sector (240a, 240b, 240c), and for writing information to magnetic recording media 222, such as that comprising servo sector (240a, 240b, 240c). A pack writer comprises a disk stack, such as disk stack 158 as presented in FIG. 1 and at least one HGA 128. Disk stack 158 can benefit from embodiments of the present invention at the disk stack level of assembly.

In accordance with an embodiment of the present invention, servo-writer 410 comprises a media writer. A media writer comprises an HGA such as HGA 128. HGA 128 comprises magnetic transducer 215 which is configured for reading information from magnetic recording media 222, such as that contained in servo sector (240a, 240b, 240c), and for writing information to magnetic recording media 222, such as that comprising servo sector (240a, 240b, 240c). A media writer comprises at least one disk, such as disk 156 as presented in FIG. 1 and at least one HGA 128. Disk 156 can benefit from embodiments of the present invention at the disk component level.

In accordance with an embodiment of the present invention, system 405 comprises calculating module 420 configured for calculating at least one corrected radial reference point for a track pitch error written on a magnetic recording media 222. The corrected radial reference point is calculated by identifying at least one inconsistency between a mechanical response of an actuator and an expected track pitch, whereby a corrected location for at least one servo track is identified.

It has been discovered that the gain in a servo loop, which comprises VCM 142 and a read signal amplifier typically contained within A/E module 115, is very repeatability and predictability. Consequently the movement of HSA 120, aka actuator 120, is also very repeatable and predictable for a given power setting. When predetermined power is delivered to VCM 142, the resulting arcuate location of magnetic transducer 215 is known with a high degree of certainty. A corrected radial reference point can be calculated by identifying an inconsistency between the mechanical response of HSA 120 and the track pitch of servo tracks 310. Servo tracks 310 are counted, as magnetic transducer 215 is moved arcuately across disk surface 130, and compared with the quantity of tracks expected to be traversed, as predicted by the power delivered to VCM 142. The corrected radial reference point for the track pitch error written by the previous servo-write pass on magnetic recording media 222 can be used to identify a corrected location for writing a corrected track pitch on magnetic recording media 222 in a subsequent servo-write pass.

In accordance with an embodiment of the present invention, calculating module 420 of system 405 comprises gain recording device 422 configured for recording a gain of a servo loop coupled with magnetic transducer 215, which is used for the previous servo-write pass. Gain recording device 422 is also configured to record a servo gain of a servo loop coupled with a reference servo system.

A reference servo system is generated by servo-writing a disk similar to disk 156. In accordance with an embodiment of the present invention, disk 156 is coupled with a media writer, a disk stack similar to disk stack 158, or an HDD similar to HDD 100. A clock head, well known to one of ordinary skill in the art, is moved arcuately across disk surface 130 by an external precision actuating device so as to precisely locate a magnetic transducer similar to magnetic transducer 215 at a precise radius of disk 156 independent of a servo loop. Servo tracks similar to servo tracks 310 are written onto magnetic recording media similar to magnetic recording media 222. By writing with a clock head, servo tracks similar to servo tracks 310 onto magnetic recording media similar to magnetic recording media 222, a reference servo system and track pitch is generated that is not exposed to the problems associated with self-servo-written tracks and APC.

In accordance with an embodiment of the present invention, calculating module 420 of system 405 comprises offset recording apparatus 424 configured for recording offset 325 between write element 320 and read element 330 of magnetic transducer 215. Offset 325 may comprise two components; a design component whereby the write element 320 is deposited such that in operation write element 320 is closer to the OD of disk 156 than read element 330; and a dynamic component whereby write element 320 in operation is closer to the OD of disk 156 than read element 330 due to the geometry of the arcuate path through which magnetic transducer 215 is actuated. The dynamic component of offset 325 changes as a function of the radius on disk 156 at which magnetic transducer 215 is positioned. The design component of offset 325 is fixed by the design of magnetic transducer 215, but can vary from magnetic transducer to magnetic transducer depending upon manufacturing tolerances. Some designs of magnetic transducer 215 may have offset 325 designed to be nominally zero.

In accordance with an embodiment of the present invention, calculating module 420 of system 405 comprises deriving module 426 configured for deriving a theoretical offset between write element 320 and read element 330 of magnetic transducer 215. The theoretical offset between write element 320 and read element 330 of magnetic transducer 215 matches a track pitch of the reference servo system as if magnetic transducer 215 were to operate with the reference servo system. By deriving a theoretical offset to match the track pitch of the precisely generated reference servo system, a comparison can be made between measured offset 325 and the derived theoretical offset. The difference between measured offset 325 and the derived theoretical offset allows the calculation of a difference in the actual track pitch of servo tracks 310 and the track pitch of the reference servo system. Such a calculation comprises the geometric relationships between track pitch of servo tracks 310, offset 325, and radial position of magnetic transducer 215 for the actual track pitch of servo tracks 310 and the track pitch of the reference servo system.

In accordance with an embodiment of the present invention, system 405 comprises servo-writer 410. Servo-writer 410 propagates servo tracks 310 with a subsequent servo-write pass. The subsequent servo-write pass propagates servo tracks 310 at a location on disk surface 130 that has been corrected by calculating module 420. The location of data tracks 310 written with the subsequent servo-write pass has been optimized by calculating module 420 for data track distribution and TPI, hence optimizing reading and writing of data to and from magnetic recording media 222.

Operation

Embodiments of the present invention enable an optimum distribution of servo tracks 310 across disk surface 130 and optimum reading and writing of data to and from magnetic recording media 222. Embodiments of the present invention enable correcting a track pitch error in servo tracks 310 written on magnetic recording media 222 coupled with disk surface 130 by using a subsequent servo-write pass to write servo tracks 310 to a location wherein an error in track pitch of previously written servo tracks 310 has been analyzed.

Figure 5:
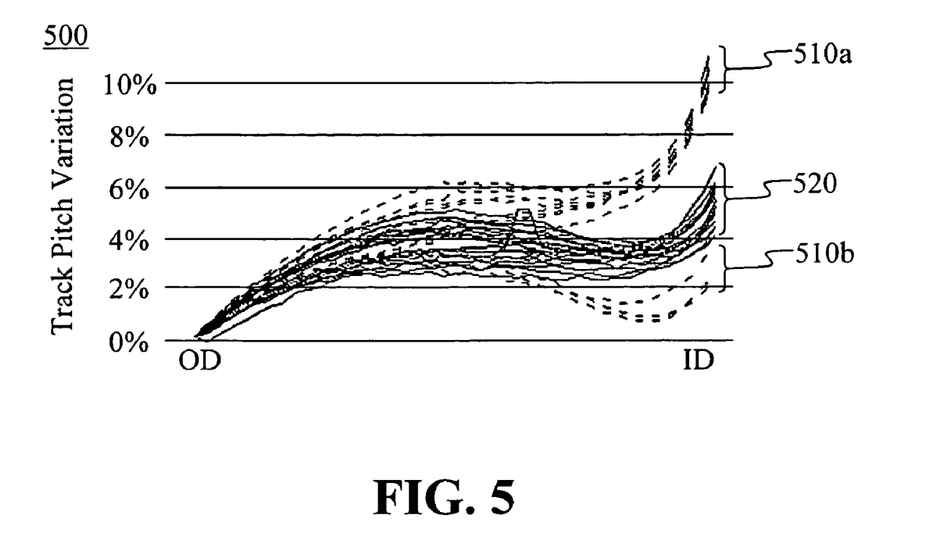
FIG. 5 is a plot of track pitch deviations in accordance with one embodiment of the present invention.

With reference to FIG. 5, plot 500 of track pitch deviations (510a, 510b, 520) is presented in accordance with one embodiment of the present invention. Plot 500 presents the track pitch deviations (510a, 510b) for a group of HDDs servo-written with a self-servo-write process which has not received the benefit of the embodiments of the present invention. Track pitch deviations (510a, 510b) present a maximum OD to ID variation of approximately 10% and a range of approximately ±4%. With the benefits of embodiments of the present invention track pitch deviations 520 for the same group of HDDs presents a maximum OD to ID variation of approximately 6% and a range of approximately ±1%. Embodiments of the present invention enable improved track pitch variation from OD to ID as well as improved distribution of track pitch for a population of HDDs that have benefited from the embodiments of the present invention.

Figure 6:
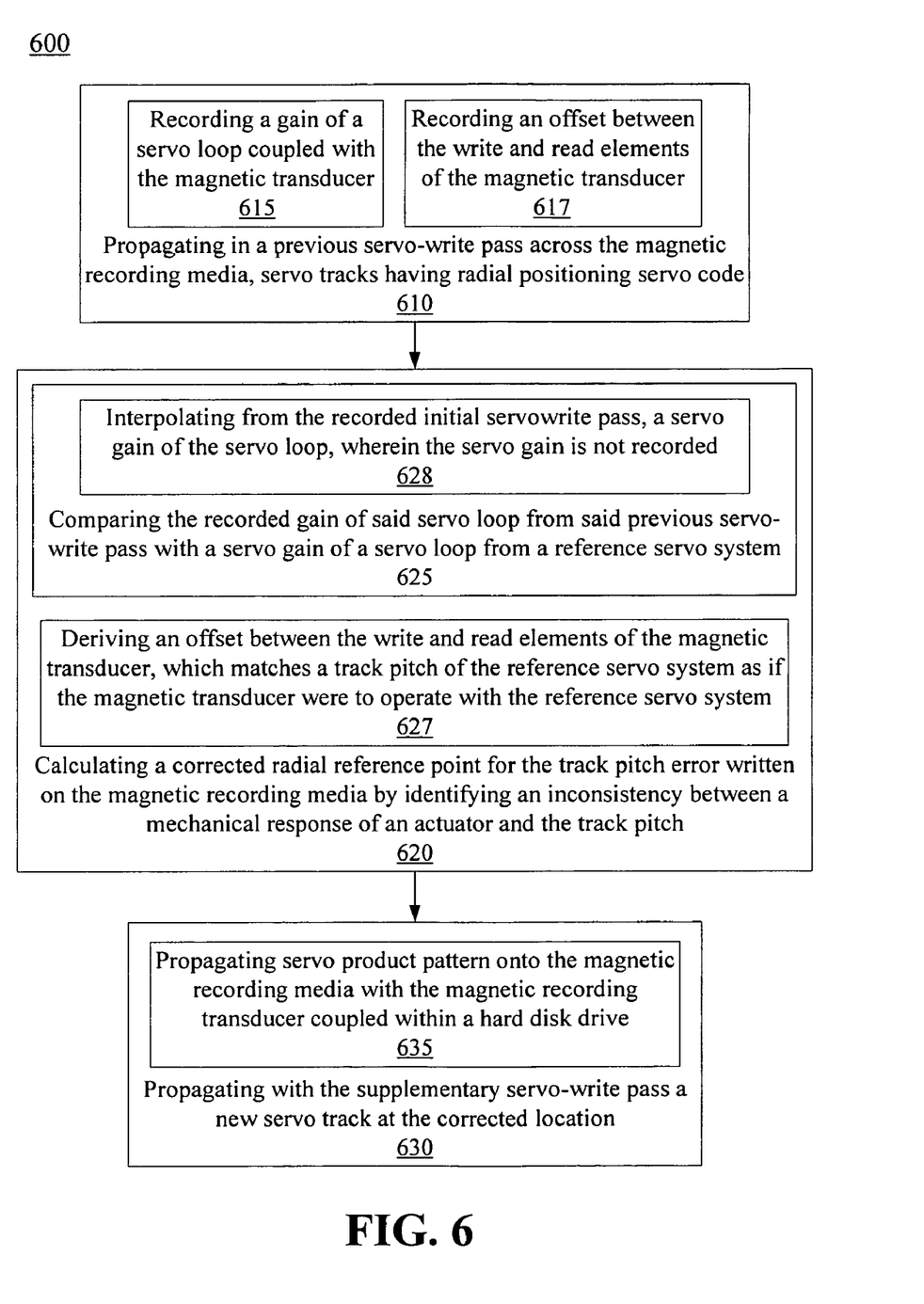
FIG. 6 is a flow chart illustrating a process for correcting a track pitch error in servo tracks written on a magnetic recording media coupled with a disk surface in accordance with one embodiment of the present invention.

FIG. 6 is a flow chart illustrating process 600 for correcting a track pitch error in servo tracks 310 written on a magnetic recording media 222 coupled with a disk surface 130 in accordance with one embodiment of the present invention. In accordance with an embodiment of the present invention, process 600 for correcting a track pitch error in servo tracks 310 written on a magnetic recording media 222 is performed within a pack writer with a magnetic transducer, such as magnetic transducer 215 coupled with the pack writer. In accordance with an embodiment of the present invention, process 600 for correcting a track pitch error in servo tracks 310 written on a magnetic recording media 222 is performed with a magnetic transducer, such as magnetic transducer 215 coupled with the hard disk drive, such as HDD 100. In accordance with an embodiment of the present invention, process 600 for correcting a track pitch error in servo tracks written on a magnetic recording media is performed within a media writer with a magnetic transducer, such as magnetic transducer 215 coupled with an HGA such as HGA 128.

In one embodiment, process 600 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific components are disclosed in process 600, such components are examples of components for carrying out process 600. That is, the embodiments of the present invention are well suited to performing various other components or variations of the components recited in FIG. 6. Within the present embodiment, it should be appreciated that the components of process 600 may be performed by software, by hardware, by an assembly mechanism, through human interaction, or by any combination of software, hardware, assembly mechanism, and human interaction.

Process 600 will be described with reference to elements shown in FIG. 1, FIG. 2, and FIG. 3.

In one embodiment, as shown at 610 of process 600, magnetic recording media 222 is propagated in a previous servo-write pass with servo tracks 310 having radial positioning servo code. Servo tracks 310 having radial positioning servo code enable magnetic transducer 215 to be positioned to at least one radial position on magnetic recording media 222. Propagating is an iterative process well known to one of ordinary skill in the art whereby magnetic transducer 215 reads initial data from a first location on magnetic recording media 222, writes the same initial data to a second location, reads the written initial data from the second location, and writes the same initial data adjacent to the first location, such that the initial data is propagated across an area of magnetic recording media 222.

In accordance with an embodiment of the present invention and as shown at 615, element 610 propagating in the previous servo-write pass of process 600 comprises, recording a gain of a servo loop coupled with magnetic transducer 215. It has been discovered that the gain in a servo loop, which comprises VCM 142 and a read signal amplifier typically contained within A/E module 115, is very repeatable and predictable. The recorded gain in the servo loop that controls the arcuate positioning of magnetic transducer 215 can be used to detect the presence of an error and/or irregularity in track pitch.

In accordance with another embodiment of the present invention and as shown at 617, element 610 propagating in the previous servo-write pass of process 600 comprises, recording offset 325 between write element 320 and read element 330 of magnetic transducer 215. Offset 325 may comprise two components; a design component whereby the write element 320 is deposited such that in operation write element 320 is closer to the OD of disk 156 than read element 330; and a dynamic component whereby write element 320 in operation is closer to the OD of disk 156 than read element 330 due to the geometry of the arcuate path through which magnetic transducer 215 is actuated. The dynamic component of offset 325 changes as a function of the radius on disk 156 at which magnetic transducer 215 is positioned. The design component of offset 325 is fixed by the design of magnetic transducer 215, but can vary from magnetic transducer to magnetic transducer depending upon manufacturing tolerances. Some designs of magnetic transducer 215 may have offset 325 designed to be nominally zero.

In one embodiment, as shown at 620 of process 600, at least one corrected radial reference point for the track pitch error written on magnetic recording media 222 is calculated by identifying at least one inconsistency between a mechanical response of an actuator and the track pitch, whereby a corrected location for at least one servo track 310 is identified. A corrected radial reference point can be calculated by identifying an inconsistency between the mechanical response of HSA 120, aka actuator 120, and the track pitch of servo tracks 310. Servo tracks 310 are counted, as magnetic transducer 215 is moved arcuately across disk surface 130, and compared with the quantity of tracks expected to be traversed, as predicted by the power delivered to VCM 142. The corrected radial reference point for the track pitch error written by the previous servo-write pass on magnetic recording media 222 can be used to identify a corrected location for writing a corrected track pitch on magnetic recording media 222 in a subsequent servo-write pass.

In accordance with an embodiment of the present invention and as shown at 625, element 620 calculating a corrected radial reference point of process 600 comprises comparing the recorded gain of the servo loop from the previous servo-write pass with a servo gain of a servo loop from a reference servo system. A reference servo system is generated by servo-writing a disk similar to disk 156. In accordance with an embodiment of the present invention, disk 156 is coupled with a media writer, a disk stack similar to disk stack 158, or an HDD similar to HDD 100. A clock head, well known to one of ordinary skill in the art, is moved arcuately across disk surface 130 by an external precision actuating device so as to precisely locate a magnetic transducer similar to magnetic transducer 215 at a precise radius of disk 156 independent of a servo loop. Servo tracks similar to servo tracks 310 are written onto magnetic recording media similar to magnetic recording media 222. By writing with a clock head, servo tracks similar to servo tracks 310 onto magnetic recording media similar to magnetic recording media 222, a reference servo system and track pitch is generated that is not exposed to the problems associated with self-servo-written tracks and APC.

In accordance with another embodiment of the present invention and as shown at 627, element 620 calculating a corrected radial reference point of process 600 comprises deriving a theoretical offset between write element 320 and read element 330 of magnetic transducer 215, which matches a track pitch of the reference servo system as if magnetic transducer 215 were to operate with the reference servo system. The theoretical offset between write element 320 and read element 330 of magnetic transducer 215 matches a track pitch of the reference servo system as if magnetic transducer 215 were to operate with the reference servo system. By deriving a theoretical offset to match the track pitch of the precisely generated reference servo system, a comparison can be made between measured offset 325 and the derived theoretical offset. The difference between measured offset 325 and the derived theoretical offset allows the calculation of a difference in the actual track pitch of servo tracks 310 and the track pitch of the reference servo system. Such a calculation comprises the geometric relationships between track pitch of servo tracks 310, offset 325, and radial position of magnetic transducer 215 for the actual track pitch of servo tracks 310 and the track pitch of the reference servo system.

In accordance with another embodiment of the present invention and as shown at 628, element 625 comparing the recorded gain of process 600 comprises interpolating from the recorded previous servo-write pass, a servo gain of the servo loop, wherein the servo gain is not recorded. A self-servo-write process is a lengthy process wherein the recording of all servo gains at every radial position on disk surface 130 is impractical. Interpolation of servo gains between radial positions of recorded servo gain is a reasonable compromise to recording all servo gains for all radial positions on disk surface 130.

In one embodiment, as shown at 630 of process 600, at least one new servo track servo-written in accordance with a corrected location calculated at 620 of process 600, is propagated with the subsequent servo-write pass. In accordance with an embodiment of the present invention, and as shown at 635, element 630 propagating with the subsequent servo-write pass comprises, propagating servo product pattern onto magnetic recording media 222 with magnetic recording transducer 215 coupled within HDD 100. The servo product pattern comprises corrected radial positioning servo code as well as servo data that is particular to the design of the HDD in which the servo data will operate.

The present invention, in the various presented embodiments enables optimum data track distribution across the disk surface and optimum reading and writing of data to and from the magnetic recording media. Track pitch control is improved during self-servo-write through embodiments of the present invention. Embodiments of the present invention enable detection and correction of previously unidentifiable track pitch errors from a previous servo-write pass.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for correcting a track pitch error in servo tracks written on a magnetic recording media coupled with a disk surface by using a subsequent servo-write pass, said method comprising:

propagating in a previous servo-write pass across said magnetic recording media, servo tracks having radial positioning servo code, whereby a magnetic transducer is enabled to be positioned to at least one radial position on said magnetic recording media;

calculating at least one corrected radial reference point for said track pitch error written on said magnetic recording media by identifying at least one inconsistency between a mechanical response of an actuator and a track pitch, whereby a corrected location for at least one said servo track is identified;

comparing a recorded gain of a servo loop from said previous servo-write pass with a servo gain of a servo loop from a reference servo system; and propagating with said subsequent servo-write pass at least one new servo track at said corrected location.

2. The method of claim 1, wherein said propagating during said previous servo-write pass said servo tracks comprises:

recording a gain of a servo loop coupled with said magnetic transducer.

3. The method of claim 1, wherein said propagating during said previous servo-write pass said servo tracks comprises:

recording an offset between a write element and a read element of said magnetic transducer.

4. The method of claim 1, wherein said calculating at least one corrected radial reference point for said track pitch error written on said magnetic recording media comprises:

deriving a theoretical offset between a write element and a read element of said magnetic transducer, which matches a track pitch of a reference servo system as if said magnetic transducer were to operate with said reference servo system.

5. The method of claim 1, wherein propagating with said subsequent servo-write pass at least one new servo track at said corrected location, comprises:

propagating servo product pattern onto said magnetic recording media with said magnetic transducer coupled within a hard disk drive.

6. The method of claim 1, wherein said comparing said recorded gain of said servo loop from said previous servo-write pass with said servo gain of said servo loop from said reference servo system comprises:

interpolating from a recorded said previous servo-write pass, a servo gain of said servo loop, wherein said servo gain is not recorded.

7. A system for correcting a track pitch error in servo tracks written on a magnetic recording media coupled with a disk surface by using a subsequent servo-write pass, said system comprising:

a servo-writer for propagating in a previous servo-write pass across said magnetic recording media, servo tracks having radial positioning servo code, with which a magnetic transducer is enabled to be positioned to at least one radial position on said magnetic recording media;

a calculating module configured for calculating at least one corrected radial reference point for said track pitch error written on said magnetic recording media by identifying at least one inconsistency between a mechanical response of an actuator and an expected track pitch, whereby a corrected location for at least one said servo track is identified and wherein said calculating module comprises:

a gain recording device configured to record:

a gain of a servo loop coupled with said magnetic transducer used for said previous servo-write pass; and a servo gain of a servo loop coupled with a reference servo system; and a servo-writer for propagating with said subsequent servo-write pass at least one new servo track at said corrected location.

8. The system of claim 7, wherein said servo-writer for propagating said servo tracks in said previous servo-write pass across said magnetic recording media comprises:

a hard disk drive.

9. The system of claim 7, wherein said servo-writer for propagating said servo tracks in said previous servo-write pass across said magnetic recording media comprises:

a pack writer.

10. The system of claim 7, wherein said calculating module, configured for calculating at least one said corrected radial reference point for said track pitch error comprises:

an offset recording apparatus configured for recording an offset between a write element and a read element of said magnetic transducer.

11. The system of claim 7, wherein said calculating module, configured for calculating at least one said corrected radial reference point for said track pitch error comprises:

a deriving module configured for deriving a theoretical offset between a write element and a read element of said magnetic transducer, which matches a track pitch of a reference servo system if said magnetic transducer were to operate with said reference servo system.

12. A computer-readable memory containing executable instructions, wherein said instructions when executed effect a method for correcting a track pitch error in servo tracks written on a magnetic recording media coupled with a disk surface by using a subsequent servo-write pass, said method comprising:

propagating in a previous servo-write pass across said magnetic recording media, servo tracks having radial positioning servo code, whereby a magnetic transducer is enabled to be positioned to at least one radial position on said magnetic recording media;

calculating at least one corrected radial reference point for said track pitch error written on said magnetic recording media by identifying at least one inconsistency between a mechanical response of an actuator and a track pitch, whereby a corrected location for at least one said servo track is identified;

comparing a recorded gain of a servo loop from said previous servo-write pass with a servo gain of a servo loop from a reference servo system; and propagating with said subsequent servo-write pass at least one new servo track at said corrected location.

13. The computer-readable memory as described in claim 12, wherein said propagating during said previous servo-write pass said servo tracks comprises:

recording a gain of a servo loop coupled with said magnetic transducer.

14. The computer-readable memory as described in claim 12, wherein said propagating during said previous servo-write pass said servo tracks comprises:

recording an offset between a write element and a read element of said magnetic transducer.

15. The computer-readable memory as described in claim 12, wherein said calculating at least one corrected radial reference point for said track pitch error written on said magnetic recording media comprises:
    deriving a theoretical offset between a write element and a read element of said magnetic transducer, which matches a track pitch of a reference servo system if said magnetic transducer were to operate with said reference servo system.

16. The computer-readable memory as described in claim 12, wherein propagating with said subsequent servo-write pass at least one new servo track at said corrected location, comprises:
    propagating servo product pattern onto said magnetic recording media with said magnetic transducer coupled within a hard disk drive.

17. The computer-readable memory as described in claim 12, wherein said comparing said recorded gain of said servo loop from said previous servo-write pass with said servo gain of said servo loop from said reference servo system comprises:
    interpolating from a recorded said previous servo-write pass, a servo gain of said servo loop, wherein said servo gain is not recorded.

* * * * *